United States Patent
Lenzie

(10) Patent No.: US 6,182,079 B1
(45) Date of Patent: Jan. 30, 2001

(54) SPECIFYING INDEXES BY EVALUATING COSTS SAVINGS FOR IMPROVING OPERATION IN RELATIONAL DATABASES

(75) Inventor: Robert Stephen Lenzie, Hertfordshire (GB)

(73) Assignee: British Telecommunications public limited company, London (GB)

(*) Notice: Under 35 U.S.C. 154(b), the term of this patent shall be extended for 0 days.

(21) Appl. No.: 09/091,601
(22) PCT Filed: Dec. 16, 1996
(86) PCT No.: PCT/GB96/03102
 § 371 Date: Jun. 19, 1998
 § 102(e) Date: Jun. 19, 1998
(87) PCT Pub. No.: WO97/22939
 PCT Pub. Date: Jun. 26, 1997

(30) Foreign Application Priority Data

Dec. 20, 1995 (GB) .................................... 9526096

(51) Int. Cl.⁷ .................................... G06F 17/30
(52) U.S. Cl. .................... 707/101; 707/104; 707/100
(58) Field of Search .................... 707/100, 101, 707/104

(56) References Cited

U.S. PATENT DOCUMENTS

| 4,805,099 | * | 2/1989 | Huber ................................... 707/102 |
| 4,956,774 | * | 9/1990 | Shibamiya et al. ...................... 707/2 |
| 5,404,510 | * | 4/1995 | Smith et al. .............................. 707/2 |

FOREIGN PATENT DOCUMENTS 0 351 388  1/1990  (EP) .

* cited by examiner

*Primary Examiner*—Thomas G. Black
*Assistant Examiner*—William Trinh
(74) *Attorney, Agent, or Firm*—Nixon & Vanderhye P.C.

(57) ABSTRACT

An index set for a databse is specified by analyzing a sample (718) of SQL statements applied to the database (701). Indexes (707) are identified that could assist in the execution of the analyzed statements and levels of improved operation are evaluated for each of said indexes. The evaluated levels are then processed (708) to specify an index set for inclusion on the database. The database may not include sufficient storage (702) for all of the specified indexes to be included, therefore the available storage space is allocated and indexes are selected on a prioritized basis.

29 Claims, 18 Drawing Sheets

| EVENT NUMBER | DAY | START TIME | END TIME | TELEPHONE NUMBER | CALL TYPE |
|---|---|---|---|---|---|
| 12345 | 01-12-95 | 00:01 | 00:25 | 404 7241 | A |
| 12346 | 01-12-95 | 00:01 | 00:10 | 386 4851 | A |
| 12347 | 01-12-95 | 00:01 | 00:53 | 339 1234 | G |
| 12348 | 01-12-95 | 00:01 | 00:14 | 586 1495 | B |
| 12349 | 01-12-95 | 00:02 | 00:15 | 833 1497 | B |
| 12350 | 01-12-95 | 00:02 | 00:36 | 947 8281 | C |
| 12351 | 01-12-95 | 00:02 | 00:05 | 321 4875 | C |
| | | | | | |

Fig. 3A

| TELEPHONE NUMBER | CUSTOMER ID |
|---|---|
| 404 7241 | 012836 |
| 404 7242 | 057896 |
| 404 7243 | 86149 |
| 404 7244 | 83176 |
| 404 7245 | 3238561 |
| 404 7246 | 33987 |
| 404 7247 | 3398762 |

Fig. 3B

| CUSTOMER ID | STREET NO | STREET | TOWN |
|---|---|---|---|
| 74 893 | 16 | SHEPPARD | IPSWITCH |
| 74 894 | 47 | LIGHTFOOT | LIVERPOOL |
| 74 895 | 52 | HIGH HOLBORN | LONDON |
| 74 896 | 195 | SHIRLAND | SHEFFIELD |
| 74 897 | 10 | DOWNING | LONDON |
| 74 898 | 85 | ABBEY | LONDON |
| 74 899 | 198 | BAKER | LONDON |
|  |  |  |  |

| TOOL | REGION |
|---|---|
| LIVERPOOL | NORTH WEST |
| LONDON | SOUTH EAST |
| LOUGHBOROUGH | EAST MIDLANDS |
| " | " |
| " | " |
|  |  |

| TELEPHONE NUMBER | EVENT NUMBER |
|---|---|
| 404 7241 | 12 345 |
| | 14 876 |
| | 15 739 |
| | 15 928 |
| | 16 047 |
| | |
| 404 7242 | 13 728 |
| | 14 937 |
| | 15 821 |
| | 17 423 |
| | |
| 404 7243 | 13 846 |
| | 15 736 |
| | 16 842 |

| EVENT TYPE | EVENT NUMBER |
|---|---|
| A | 12 345 |
| | 13 856 |
| | 14 024 |
| | 14 572 |
| | 14 831 |

601

| EVENT TYPE | EVENT NUMBER |
|---|---|
| B | 13 728 |
| | 14 937 |
| | 15 821 |
| | 17 423 |

602

| EVENT TYPE | EVENT NUMBER |
|---|---|
| C | 12 350 |
| | 13 896 |
| | 14 742 |
| | 14 937 |

Fig. 6

| | 1201 | 1202 | 1203 |
|---|---|---|---|
| | TABLE | STATEMENT LABEL | FREQUENCY |
| TABLE 1 | SQL A | x |
| | SQL B | y |
| | SQL C | z |
| | ⋮ | |
| | SQL Z | a |
| TABLE 2 | SQL B | y |
| | SQL D | m |
| | SQL F | p |
| | ⋮ | |
| | SQL Y | b |
| TABLE 3 | SQL A | x |
| | SQL D | m |
| | SQL F | p |
| | ⋮ | |
| | SQL X | c |

Fig. 12

| | INDEX | COST SAVING | NORMALIZED | DISTRIBUTION |
|---|---|---|---|---|
| 1 | 1625 | 73 | 1460 | 8540-9999 |
| 2 | 1616 | 72 | 1440 | 7101-8540 |
| 3 | 1604 | 68 | 1360 | 5741-7100 |
| 4 | 1673 | 59 | 1180 | 4561-5740 |
| 5 | 1612 | 58 | 1160 | 3401-4560 |
| 6 | 1646 | 49 | 980 | 2421-3400 |
| 7 | 1635 | 43 | 860 | 1561-2420 |
| 8 | 1691 | 37 | 740 | 821-1560 |
| 9 | 1622 | 21 | 420 | 401-820 |
| 10 | 1683 | 16 | 320 | 81-400 |
| 11 | 1617 | 4 | 80 | 0-80 |
| | TOTAL | 500 | | |

SPECIFYING INDEXES BY EVALUATING COSTS SAVINGS FOR IMPROVING OPERATION IN RELATIONAL DATABASES

INTRODUCTION

The present invention relates to specifying indexes for relational databases. The present invention also relates to a relational database including processes for specifying indexes.

Data processing environments are known in which executable instructions are arranged to produce a data set derived from data contained within a database in response to a data enquiry. Data may be accessed directly from data tables, where it may be necessary to search all entries within the table in order to obtain the information required. Alternatively, searching procedures may also make use of indexes in order to substantially increase the speed of a searching process.

Designing index structures for large and heavily used databases is presently an extremely difficult exercise and highly susceptible to the introduction of errors. This problem exists because the technical demands and constraints are such that it is not possible for a human database administrator to simultaneously perceive the indexing requirements for, typically, hundreds or thousands of different structured query language (SQL) statements, that run against the database on a day-to-day basis, and then to convert these requirements into a preferred set of indexes defined over the whole database. However, poorly specified index designs will result in SQL statements that consume far too much of the processor facility, that run for far longer than they should and result in a machine that is heavily overloaded.

For a long time, there has been a requirement for procedures that globally specify index structures defined over a given database design, for a typical SQL workload, which may be referred to as a target workload. However, this technical problem has persisted given the inherent difficulties of realising a technical solution, implemented and taking advantage of the processing capability available, without requiring intuitive mental processes on the part of human operators.

SUMMARY OF THE INVENTION

According to a first aspect of the present invention, there is provided a method of specifying a set of indexes for a database, comprising the steps of: analysing a plurality of statements supplied to said database to identify indexable predicates; deriving indexes from the indexable predicates identified in said analysing step; evaluating levels of improved operation achievable with said indexes; processing said evaluated levels to specify a preferred set of indexes for said database.

In a preferred embodiment levels of improved operation are evaluated by creating a scaled-down model of database tables derived from information relating to the nature of said tables. Typically, the scaled-down model may include in the region of 5000 data entries per table. Preferably, the model database is populated with representative data entries taken from the live database being modelled and said model may be populated by considering the cardinality of an existing index of the live database. In addition, the database model may be populated by considering the distribution of entries within an existing index of the live database.

In a preferred embodiment, database statistics are copied from the live. database to the database model. Preferably, a base level cost is calculated for executing statements without additional indexes being present. Preferably, cost levels are obtained by estimating execution time. In addition, cost levels may be estimated by assessing index maintenance overheads.

According to a second aspect of the present invention, there is provided an apparatus for specifying an index set for a database comprising: analysing means for analysing a plurality of statements supplied to the database to identify indexable predicates; deriving means operable to derive indexes from the indexable predicates identified by said analysing means; evaluating means for evaluating levels of improved operation achievable with said indexes; and specifying means operable to process said evaluated levels and specify a preferred set of indexes for said database.

In a preferred embodiment possible indexes are identified from predicate sets defined by said statements.

According to a third aspect of the present invention, there is provided data processing apparatus arranged to specify an index set for a database, said apparatus comprising data storage means, data processing means and program instructions readable from said data storage means, wherein said processing means is configured, in response to said instructions, to provide means for: analysing a plurality of statements supplied to said database to identify indexable predicates; deriving indexes from the indexable predicates identified in said analysing step; evaluating levels of improved operation achievable with said indexes; and processing said evaluated levels to specify a set of preferred indexes for said database.

In a preferred embodiment, cost savings are calculated by processing cost values of the old SQL statement costs and of the new SQL statement costs with a possible index. Cost saving may be calculated by subtracting the new costs from the old costs. Preferably, cost savings are calculated for to tables by considering each new possible index in turn with reference to its respective table.

In a preferred embodiment, possible indexes are ordered in terms of potentiality for being specified as preferred indexes. Index combinations may be identified by randomly combining existing potential indexes and processing said evaluated levels to specify a set of preferred indexes.

According to a fourth aspect of the present invention, there is provided a database comprising a plurality of data tables stored in machine readable form, processing means for processing said data tables in response to statements and for generating indexes to facilitate the processing of said data tables, further comprising instructions executable by said processing means for specifying a preferred index set, wherein said instructions are configured to analyse a plurality of statements supplied to said database to identify indexable predicates, derive indexes from said indexable predicates, evaluate levels of improved operation achievable with said indexes and process said evaluated levels to specify a preferred index set for said database.

BRIEF DESCRIPTION OF THE DRAWINGS

FIGS. 3A 3B, 4A and 4B illustrate examples of data tables, of the type stored on data storage devices shown in FIG. 2.

FIGS. 5 and 6 illustrate examples of indexes derived from the data contained within the table shown in FIG. 3A;

FIG. 12 illustrates a table of data created using the process identified in FIG. 11;

FIG. 16 details an example of data produced during the process illustrated in FIG. 15;

A PREFERRED EMBODIMENT

The invention will now be described by way of example only, with reference to the accompanying drawings identified above.

Figure 1:
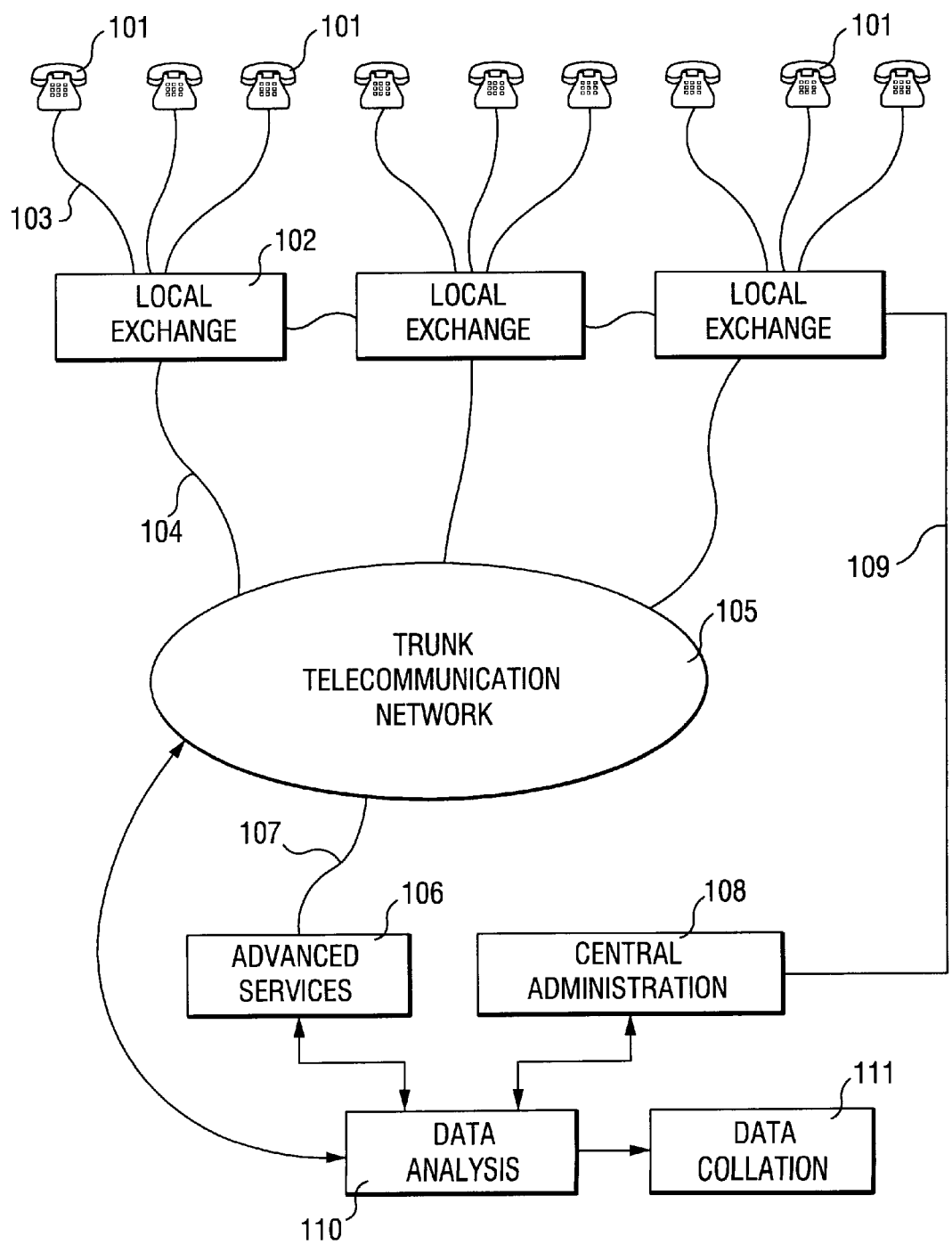
FIG. 1 shows a telecommunications environment including a data analysis system.

A telecommunications environment is illustrated in FIG. 1 in which a plurality of telecommunications user-equipments 101, such as telephone handsets, fax machines and modems etc, are connected to local exchanges 102 via respective local analog lines 103. At the local exchanges 102 analog signals are digitized; with subsequent switching and re-routing being performed within the digital domain. This results in many calls being routed over a digital time division multiplexed channel 104 to a trunk telecommunication network 105.

The local exchanges 102 and trunk network 105 provide conventional telecommunications switching and allow calls to be connected in a conventional way. In addition, more advanced services are provided by an advanced service node 106, allowing customers to gain access to advanced services such as store and forward facilities and personal number identification etc. Customers gain access to the advanced service node 106 via a digital multiplex 107 connected to the trunk network 105. Thus, calls may be routed via the trunk network 105 to the advanced service node 106, whereafter information may be sent back to a calling customer and calls may be re-routed, via the trunk network 105 to terminal equipment 101, elsewhere. Alternatively, the functionality of the advanced service node 106 may be distributed throughout the trunk telecommunication network 105.

When a call is made, charging details relating to the call are stored at the associated local exchange 102. Subsequently, this calling information, representing chargeable usage made by connected customers, is supplied to a central administration unit 108 via a communications channel 109. In this way, all charging information is directed towards the central administration unit 108 that is in turn responsible for the generation and distribution of customer accounts.

In operation, the system consisting of the terminal equipment 101, the local exchanges 102, the trunk network 105 and the advanced service node 106 connect a very large number of calls resulting in the generation of a very large corpus of operational data. Primarily, this data will identify details concerning the nature of the originating call, the nature of the destination call and the call type. Call type information may identify the call as being a straightforward local call, alternatively the call may be long distance, international or may involve the use of the services provided by the advanced service node 106. Analysis of this data may provide at least two significant benefits. Firstly, in response to data being collected representing the operational nature of the system, it may be possible to make alterations to the way in which the system operates. Thus, if it has been found that a particular region makes substantially more use of advanced services than that or another region, it may be possible to redirect the allocation of these services so as to optimize their availability. Similarly, an assessment of network usage may also be made available to the designers of marketing strategies, particularly when efforts are being made to make better use of the available capacity during off peak periods.

In practice, substantially similar queries will tend to be executed upon the database at regular intervals. Operational divisions may have particular interests and require their interests to be up-dated on a regular basis. A very large number of users may be given access to the database thus, over a period of time, hundreds and possibly thousands of SQL queries may be executed upon the data contained within the database and a large proportion of these queries will be executed many times, in order to produce up-dated results as new data is included.

The system shown in FIG. 1 includes a data analysis unit 110 arranged to receive data from the trunk network 105, the advanced service node 106 and the central administration unit 108. In turn, the data analysis unit may provide data back to the trunk network 105, the advanced service node 106 and the central administration unit 108. Within the trunk network 105 and the advanced service node 106, modifications may be made to the technical operation of these systems in response to data received back from the data analysis unit. Similarly, data supplied back to the central administration unit 108 may result in changes being made to the way in which customers are invoiced; generally in an attempt to modify the way in which customers make use of the network.

Data will be collected at the data analysis unit 110 and stored in a form specified by original system designers. These designers will endeavour to anticipate the types of query that will be required later, although it is not be possible for them to anticipate all queries that may become of interest. The data therefore tends to be stored at the data analysis unit in relational database terms, thereby facilitating subsequent manipulation in response to particular queries. These queries may in turn result in modifications being made to the trunk network 105, the advanced service node 106 or the central administration procedures 108. In addition, data generated in response to specific queries may be collated at the data collation unit 111 for reference or subsequent use.

Figure 2:
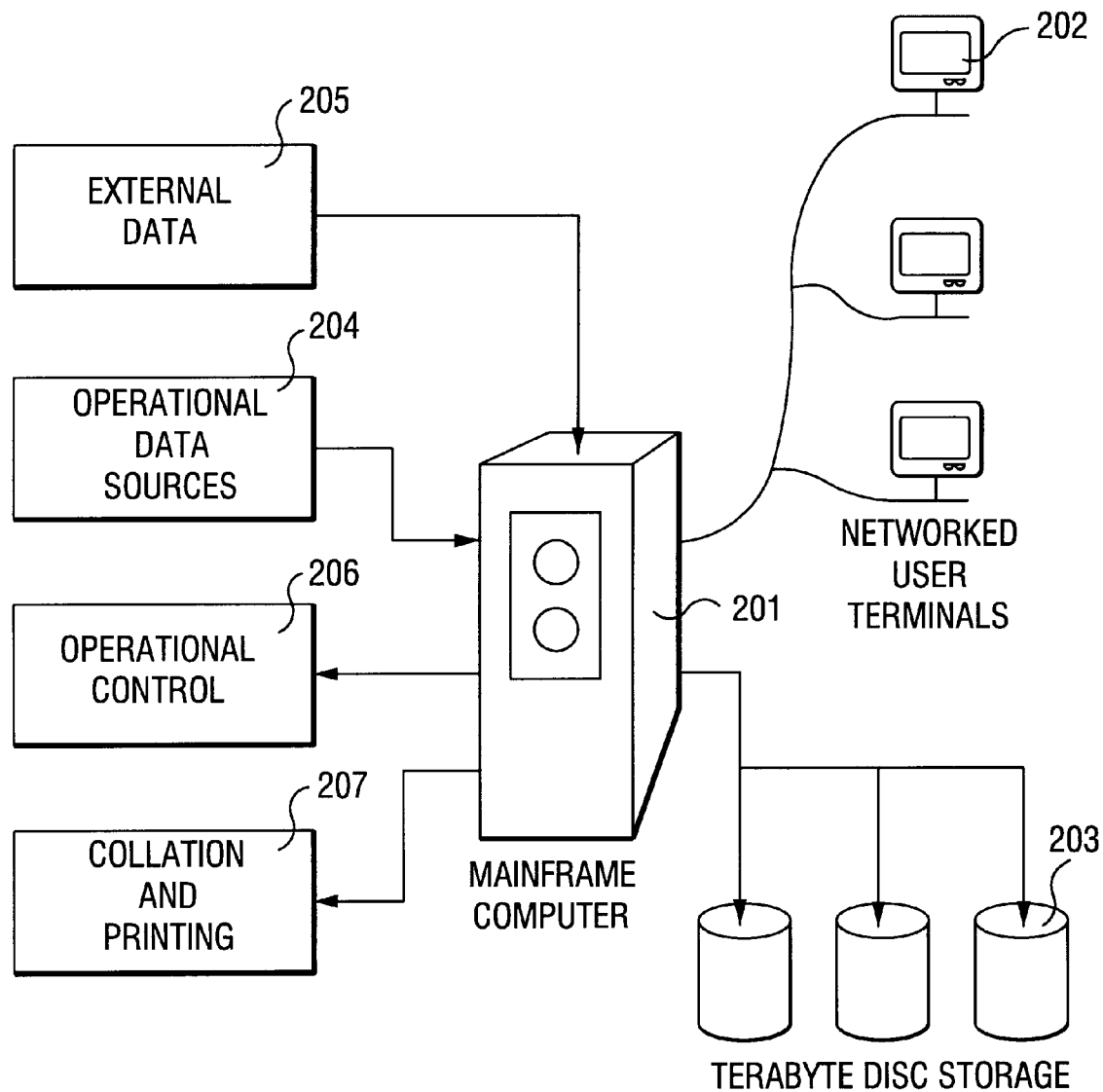
FIG. 2 details the data analysis system identified in FIG. 1 having a plurality of large disc storage devices arranged to store data tables.

The data analysis unit 110 is detailed in FIG. 2 and is substantially based around a mainframe computer 201, such as an IBM ES9000, configured with ten processors operable at 50 (million instructions per second) MIPS. Users are given access to the database system via a plurality of networked user terminals 202 and data, in the form of data tables, are stored on disc drives 203, capable of storing data volumes measured in terabytes.

Operational data sources, such as the trunk network 105, the advanced service node 106 and the central administration unit 108 are illustrated as operational data sources 204. In addition, data may be received from other external sources, illustrated by external data source 205. A flow of operational control signals back to the trunk network 105, advanced service node 106 or the central administration unit is illustrated by data being supplied to operational control devices 206 and the collation and printing of data is illustrated at 207. Data is stored in the system on the disc storage devices 203 and output data may be obtained in response to a query set up by a user using a network user terminal 202. The data retained on the disc storage device 203 may be collected on an ongoing basis in response to operation of the trunk network or other devices as shown in FIG. 1. In addition, administrative data may also be retained on the storage devices and queries may be set up so as to relate operational data to administrative data.

Examples of database tables of the type stored on the disc storage devices 203 are illustrated in FIGS. 3A, 3B, 4A and 4B. Information is received from the central administration unit 108 representing each telecommunications event. Each event is given a unique sequence number thereby creating a new record in the database, as illustrated in FIG. 3A. A record is completed by identifying the day of the event, the start time, the end time, the telephone number of the customer initiating the event and the call type. Thus, at one minute past midnight on Dec. 1, 1995, a customer with telephone number 404 7241 made a call of type A which terminated at twenty-five minutes past midnight. Arbitrary designations are given to call types in this example, wherein call type A represents local calls, call type B represents long distance calls, call type C represents long distance calls instigated by an operator and call type G represents calls making use of advanced services. The event identified above has been recorded under event number 12345, with the next event being identified under event number 12346. This was initiated by a customer having telephone number 386 4851 at one minute passed midnight on Dec. 1, 1995 and again this has been identified as a call of type A.

The database within the data analysis system 110 also includes administrative data such as that identified in FIG. 38. The table shown in FIG. 3B maps customer identifications onto customer telephone numbers. It will be appreciated that a particular customer may have a plurality of telephone lines with different telephone numbers such that it is necessary, given a particular telephone number, to identify the associated customer. Thus, in the example shown, the customer with telephone number 404 7241 has been allocated customer identification number 012836 within record 303. Similarly, record 304 shows that telephone number 404 7242 has been allocated to a customer identified with customer identification number 057896.

A table illustrated in FIG. 4A relates customer identification numbers to customer addresses. Thus, it can be seen from record 305 that the customer with identification number 0074895 is resident at 52 High Holborn, London.

Generally, it is not necessary to provide wider geographical data, given that a particular town would always be located within a particular geographical region. However, geographical regions may be adjusted by a particular operator so as to reflect changes in commercial environments. A further table is provided mapping towns and cities to particular regional areas. Thus, as identified by record 306, London has been mapped onto the South East region with Loughborough being mapped to the East Midlands region in record 307. Adjustments could be made to regional boundaries to reflect the location of regional offices, such that, for example, the East Midlands region could be combined with a West Midlands region to provide a Midlands region. Under such circumstances, it would only be necessary to modify the table shown in FIG. 4B without requiring modifications to the table shown in FIG. 4A, the table shown in FIG. 48 having substantially fewer records than the table shown in FIG. 4A.

It will be appreciated that the data table shown in FIG. 3A allows data records to be read very quickly if an enquiry is made with reference to the event number. The data table shown in FIG. 3A is sequenced in terms of event number, where each event number is unique to a particular record. Thus, given event number 1345 the database could quickly respond to the effect that the customer with telephone number 404 7241 made a call of type A. Similarly, by referring to the table shown in FIG. 38, it would be possible to relate this telephone number to a customer identification with an address and a region being identified for the query with reference to the tables shown in FIG. 4A and 48 respectively.

However, a problem would arise if queries are made with reference to other fields within the record shown in the table of FIG. 3A. For example, a query may require a list to be produced of all events initiated by a particular telephone number. Alternatively, a query may be made concerning all events of a particular call type. More complex queries may be made using entries of this type, for example, a query may be made requesting details of all calls initiated from the South East region and lasting for a duration of more than ten minutes.

Referring to the earlier example, a simple query may be made requesting details of all events initiated by a particular telephone number. The table shown in FIG. 3A has not been indexed under telephone number entries, therefore it would be necessary for the processor to search the telephone number data field of all records within the table. Clearly, this requires substantially more processor resources than reading records with reference to the event number. The table shown in FIG. 3A has been sequenced under event number so that, given an event number, a particular record may be identified very quickly. However, without being indexed under any other field, it is necessary to perform a search in order to identify particular fields of interest. Referring to the more complex example identified above, it may be necessary to satisfy a particular query by making several searches of different fields, thru all of the records contained within the table.

In order to improve the speed at which searching may be performed, it is possible to create indexes for particular tables such that rapid searching may be executed with reference to other data fields. As shown in FIG. 5, the data contained within table 3A has been used to develop an index based on telephone numbers. Each telephone number is considered one by one and an index is created identifying each particular event initiated by that particular telephone number. Thus, record 301 has been identified for telephone number 404 7241 and event 12345 has been recorded against this telephone number. Subsequently, further events were initiated by this telephone number, represented as 14876, 15739, 15928 and 16047. The index continues until all events relating to the telephone number under consideration have been recorded. Thereafter, the index continues with the next telephone number, 404 7242 in this example, against which events 13728, 14937, 15821 and 14723 etc have been recorded. Thereafter, telephone number 404 7243 is considered with events being recorded against this telephone number and so on until all of the telephone number entries within the data table shown in FIG. 3 have been considered. In the index shown in FIG. 5 the number of records present is equivalent to the number of records present in the original table shown in FIG. 3A. However, the table of FIG. 5 is only an index, thus, for a particular telephone number, the index points back to particular event numbers within the main table shown in FIG. 3A. Thus, the index allows searches to be performed quickly based on telephone number, whereafter the remaining data contained within the record of the table shown in FIG. 3A may be derived.

An index similar to that shown in FIG. 5 is shown in FIG. 6, in which the data contained within the table shown in FIG. 3A has been indexed in terms of event type. Record 301 has been reproduced as record 601 in the index shown in FIG. 6. The event identified as event number 12345 was created due to a call of type A occurring thereafter and this event number has been listed against the entry for event type A. Thereafter, event numbers 13856, 14024, 15752 and 14831 were events evoking call type A.

Thereafter, as shown in FIG. 6, events for call type B are recorded, including event 12348, placed in record 602, with subsequent events being recorded for event type B. Once all events for event type B have been recorded, the table continues with events of type C, initiated by event number 12350.

Once the index for telephone numbers shown in FIG. 5 and the index for event types shown in FIG. 6 have been produced, it is possible to use these indexes to quickly access records within the table shown in FIG. 3A based on event number, telephone number and event type. Clearly, when responding to queries, it is desirable to have these indexes available. However, the advantages of index availability must be compared against the cost involved in terms of creating and, perhaps more significantly, updating the indexes; in combination with the additional requirement for storage space. Thus, in many practical realisations, it would not be possible to create all possible indexes given that insufficient disc storage space is available. Sometimes, it is possible to increase disc storage space but in the majority of practical realisations an upper bound exists in terms of total storage space and the total amount of storage space that can be allocated for the creation of indexes.

The system shown in FIG. 2 is arranged to store very large volumes of data. Furthermore, a relatively high demand is made of this data from users executing queries in order to produce new data sets. Some of these queries will be of a one-off nature but a high proportion of the queries will be repeated enquiries made at relatively regular intervals in order to assess modifications to the required data set in response to additions and modifications made to the source data. Under these situations, it becomes virtually impossible for database administrators to accurately perceive indexing requirements in order to achieve optimum performance in response to hundreds or possibly thousands of different SQL statements executed against the database. However, if optimum indexes are not provided, queries will tend to impose excessive demands upon the central processing unit. Furthermore, such queries will tend to run for far longer than they should, thereby creating delays. As these problems persist, the machine will become heavily over-loaded and a limit will be placed upon the number of queries that can be executed in unit time. This results in poor machine utilisation, effectively increasing the system cost per-enquiry.

The present system is arranged to specify indexing structures in an attempt to overcome the technical problems identified above. The system is configured to analyze SQL statements applied to the database to specify a preferred set of possible indexes that could be used to improve the execution of SQL statements that reference the database. An estimation is made of the level of improved operation that could be achieved if possible indexes were actually available within the database system. From these estimations a preferred list of indexes is specified. Thus, subjective constraints placed on database administrators are removed, in that numerical indications are calculated, by a machine, describing the extent to which it would be desirable to include a particular index within the system, prior to resources being allocated for the actual creation of that index. These numerical indications are derived substantially from estimates of improved performance when the index is in place.

Figure 7:
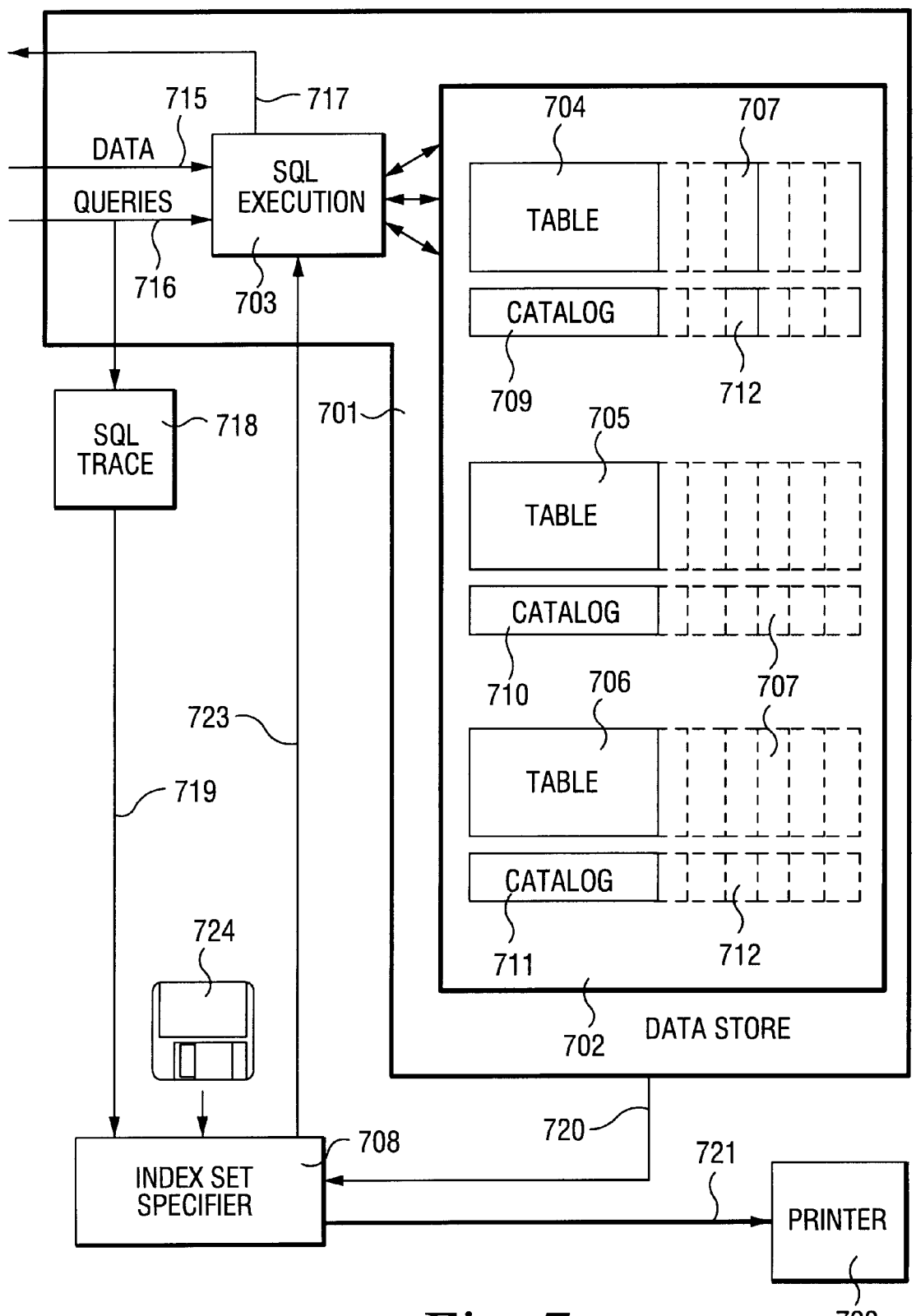
FIG. 7 illustrates a database structure implemented within the environment shown in FIG. 2, including a process for specifying indexes.

The database hardware illustrated in FIG. 2 is represented schematically in FIG. 7, along with associated processes implemented by said hardware. The database system may be configured in accordance with database instructions licensed by IBM under the Trade Mark "DB2". The resulting DB2 environment is illustrated as 710 in FIG. 7, consisting of a data store 702 and an SQL execution process 703.

In the example shown, three tables have been defined within the data store, shown as a first table 704, a second table 705 and a third table 706. Within the database system illustrated, a total of six indexes may be created for each table (this being a variable dependent upon implementation), represented by ghosted regions 707. Thus, each table may have an associated index set and the actual indexes included within the index set will be determined in accordance with procedures performed by an index set specifier, as defined by the preferred aspects of the present invention. The database also includes a catalog 709 arranged to store database definitions and catalog statistics.

Within DB2 a utility is provided identified as "RUNSTATS", configured to derive statistics about the tables, columns and indexes within the database. The catalog provides information detailing the size of tables, allowing empty tables to be created before a data transfer is effected from the live data store to a similar data store copy. In addition, the SQL execution process includes a process known as an "optimizer" that is configured to analyze the catalog statistics so as to optimize the execution of particular SQL statements.

In addition to defining the size of tables, the catalog statistics also records column cardinality, second highest and second lowest values, cluster ratio and data distribution.

Column cardinality defines the number of different values in a particular column while the full key cardinality identifies the total number of distinct values in an index defined over a table. A customer table may have a cardinality in excess of one million rows, each being distinct customers, but a column identifying the sex of these customers would only have a cardinality of two. Similarly, the cardinality of an index identifying geographical regions may be in the low hundreds.

The second highest value, identified as HIGH2KEY represents the second highest value within a particular column. Similarly, the value identified as LOW2KEY represents the second lowest value for a particular column and with this information it is possible to provide an indication of the range of possible values within a column, particularly when considered in combination with the column cardinality.

Cluster ratio provides an indication of how well the ordering of data in an index follows the ordering of the data in the originating table. When a clustering index is defined over a table and the data in that table is reorganised, every row in the table will be in clustered sequence and the cluster ratio may be considered as being one hundred per cent. Other indexes with different columns and column ordering to the clustering index may not have their data so well clustered in relation to the clustering index and will therefore tend to have a lower cluster ratio value. As rows are inserted and deleted from a table the cluster ratio of an index will gradually decline as more and more rows become out of clustering sequence. Thus, cluster ratio provides an indication of how well the data is ordered within a particular data index and is generated from a sample of live data within the respective table, in this embodiment. The data distribution statistics define the ten most frequently occurring values in a column along with their percentage occurrence.

Input information is supplied to the live database system in substantially two forms. First, new data is supplied to the system, as illustrated by input line 715 and, secondly, SQL statement queries are supplied to the database, illustrated by input line 716. Input queries on line 716 are executed by the SQL execution process 703 to produce an output, shown on output line 717. New data received on input line 715, results in tables within the data store 702 being updated and this updating process is performed in accordance with SQL commands. Thus, both input data and SQL modifications, deletions and queries are supplied to the SQL execution process 703 and are both implemented under the control of said process.

Generally, SQL statements in the form of queries or enquiries supplied on input line 716 will tend to be implemented more quickly if the SQL processor 703 has access to many indexes in addition to the primary data from the respective tables. Consequently, if the database system is required primarily to respond to enquiries of this type, it is desirable to include many indexes within the system. However, when the tables require updating in response to new data being received on input line 715, or in response to data being modified or deleted, a greater processing overhead is placed on the SQL execution process 703 if a large number of indexes are present. Thus, if the database system is primarily required as a data archive, with minimal enquiries being made to the system, it is desirable to minimize the number of indexes within the system, so as to reduce the housekeeping overhead. In most practical systems, both types of inputs are received, therefore the number of indexes present within the system will be minimized, in order to reduce the housekeeping overhead, however the choice of indexes present should be optimized, to provide optimum performance, subject to the availability of storage space.

The extent to which the specification of table indexes may approach an ideal solution will depend upon the nature of SQL enquiries supplied on input line 716. The system may be provided with many indexes but these indexes will be of little benefit if they do not relate to the predicates specified within typical SQL enquiries. Similarly, maximum benefit will be gained from available indexes if they are configured to satisfy regularly occurring SQL enquiries in preference to the less frequent SQL enquiries. However, it must also be appreciated that some SQL enquiries, although not particularly common, may be extremely important to the operation concerned (perhaps being the justfication for the system existing) such that a higher priority must be given to enquiries of this type. It can therefore be seen that a number of conflicting constraints are placed upon the index set specifier 708, which endeavours to provide optimum sets of table indexes. The SQL execution process 706 includes an optimizer process arranged to assess the optimum way for obtaining and manipulating data contained within the data store 702 in order to satisfy an SQL statement. The optimizer examines each SQL statement to be executed against the database and evaluates each of the many access paths by which the statement could be satisfied. Each possible access path is assigned a cost that represents the amount of processing and the amount of disc access that is required for the particular path to be implemented. The optimizer is then arranged to choose the access path having the lowest cost as the actual path for implementing the required functions within the SQL statement.

Statement optimization may be performed at the time of execution, known as dynamic SQL, where the contents of each SQL statement usually change from one execution to the next. Alternatively, optimization may be performed once, in advance of a statement actually being executed, with results stored within a DB2 plan. This type of optimization is known as static SQL and is used when the SQL statements are known in advance of execution. Static SQL is more efficient from the system's perspective, given that the optimization process is performed only once for the SQL statements, with results being stored for repeated execution later.

The preferred index set specifier 708 takes the provision of an optimization processes a stage further in that it is arranged to specify which indexes should actually be created, prior to the optimizer within the SQL execution process 703 making an on-line decision as to which index of the available indexes to use. However, in addition to optimizing execution, the specifier 708 should also take account of index housekeeping, execution frequency and statement priority.

The specifier 708 specifies a preferred set of indexes in response to a sample of typical SQL statements executed by the system. In order to obtain this information, an SQL trace process 718 keeps track of queries supplied on input line 716 such that, after a suitable period of time, a representative sample of SQL statements may be supplied to the specifier 708 over line 719. The specifier 708 reads catalog statistics and a sample of table data from the data store, resulting in table data being supplied over line 720. After an index set specification process has been implemented, output signals are supplied over an output line 721, enabling specification data to be generated in eye-readable form by means of a printer 722. In addition, SQL instructions are supplied to the SQL execution process 703 over line 723, resulting in preferred sets of indexes being created within the data store. Furthermore, the information generated by printer 722 may inform operators to the effect that additional storage is required within the data store in order to allow preferred sets of indexes to be implemented.

Figure 8:
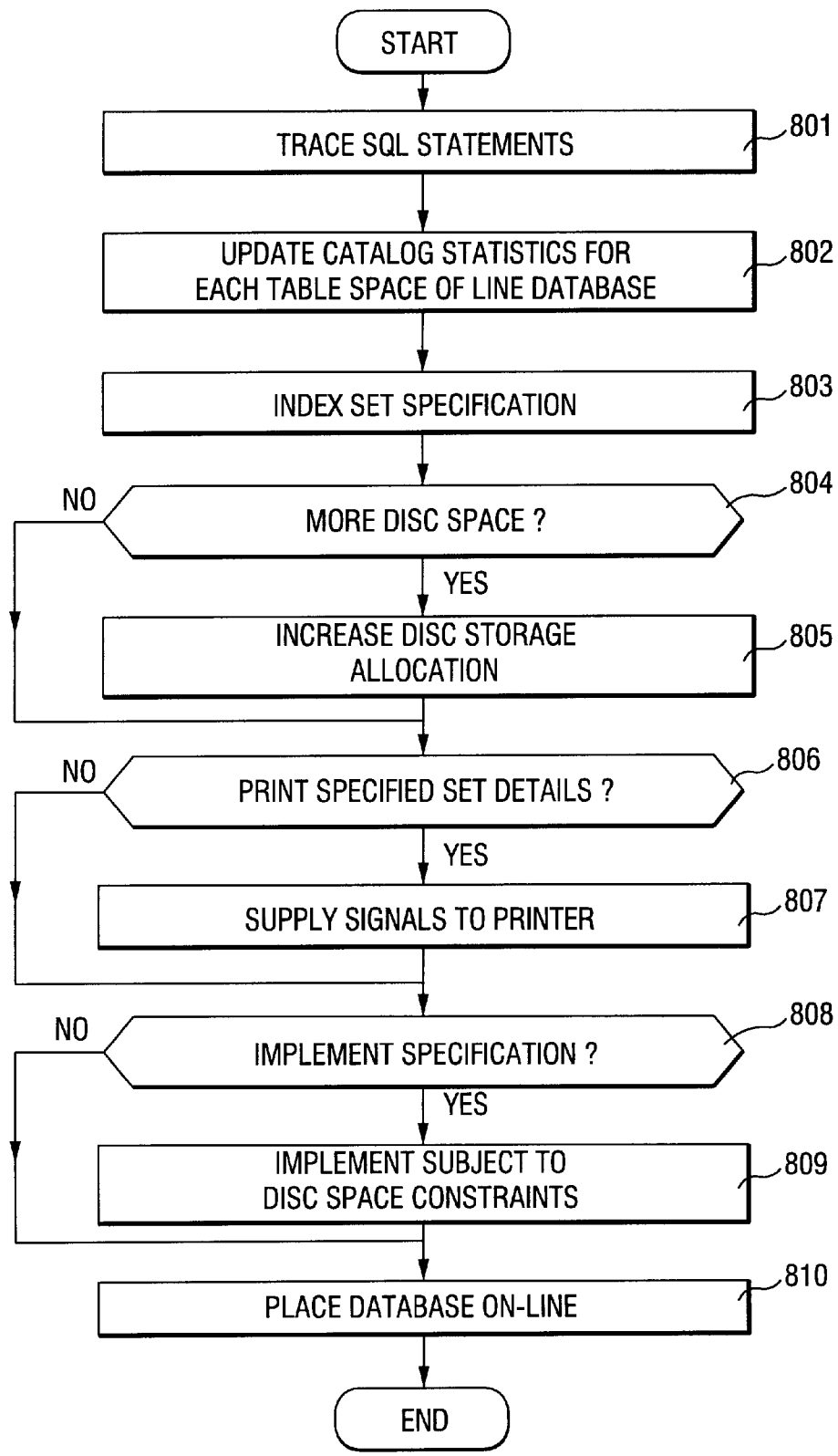
FIG. 8 illustrates processes performed within the environment shown in FIG. 7, including a process for a specifying index sets.

An overview of optimum index set specification procedures 708 are shown in FIG. 8. Firstly, at step 801 the SQL trace 718 is activated so that, over a period of time, SQL statements used to access the database are recorded by the SQL trace process. Eventually, a sample of SQL statements will have been collected and a decision will be made to the effect that the table indexes are to be re-specified.

At this stage, it is possible that the database would effectively be taken off line, such that no further queries could be implemented until the new table indexes had been specified. Under these circumstances, it is preferable for the index set specifier process to be executed on a hardware platform common to the database itself. Alternatively, in other embodiments, the index set specifier procedures may be executed independently on a separate platform with data being received from and transmitted to the database platform.

Index set specifier instructions may be supplied to an external platform, using a suitable data-carrying medium, such as a magnetic disc, an optical disc or a opto-magnetic disc. Alternatively, instructions may be supplied to the additional platform via a networking capability. The loading of instructions to the index set specifier process 708 is illustrated by removable disc 724.

At step 802 the catalog statistics for each table space of the live database are updated, using RUNSTATS, to ensure that updated data is available from the catalog when information is supplied to the index set specifier 708.

At step 803 an index set specification process is executed to specify index sets. At step 804 a question is asked as to whether more disc space is to be provided such that, when answered in the affirmative, the disc storage allocation for the creation of indexes is increased. Alternatively, the question asked at step 804 may be answered in the negative, resulting in control being directed to step 806.

At step 806 a question is asked as to whether the specified set details are to be printed and if answered in the affirmative, printing signals are supplied to printer 722 over printer connection 721, possibly in the form of a conventional parallel interface connection. Alternatively, the question asked at step 806 may be answered in the negative, resulting in control being directed to step 808.

At step 808 a question is asked as to whether the specification generated at step 803 is to be implemented on the live system and if answered in the affirmative the implementation is effected, subject to disc space constraints, at step 809. Alternatively, control is directed to step 810, resulting in the database being placed back on-line.

Figure 9:
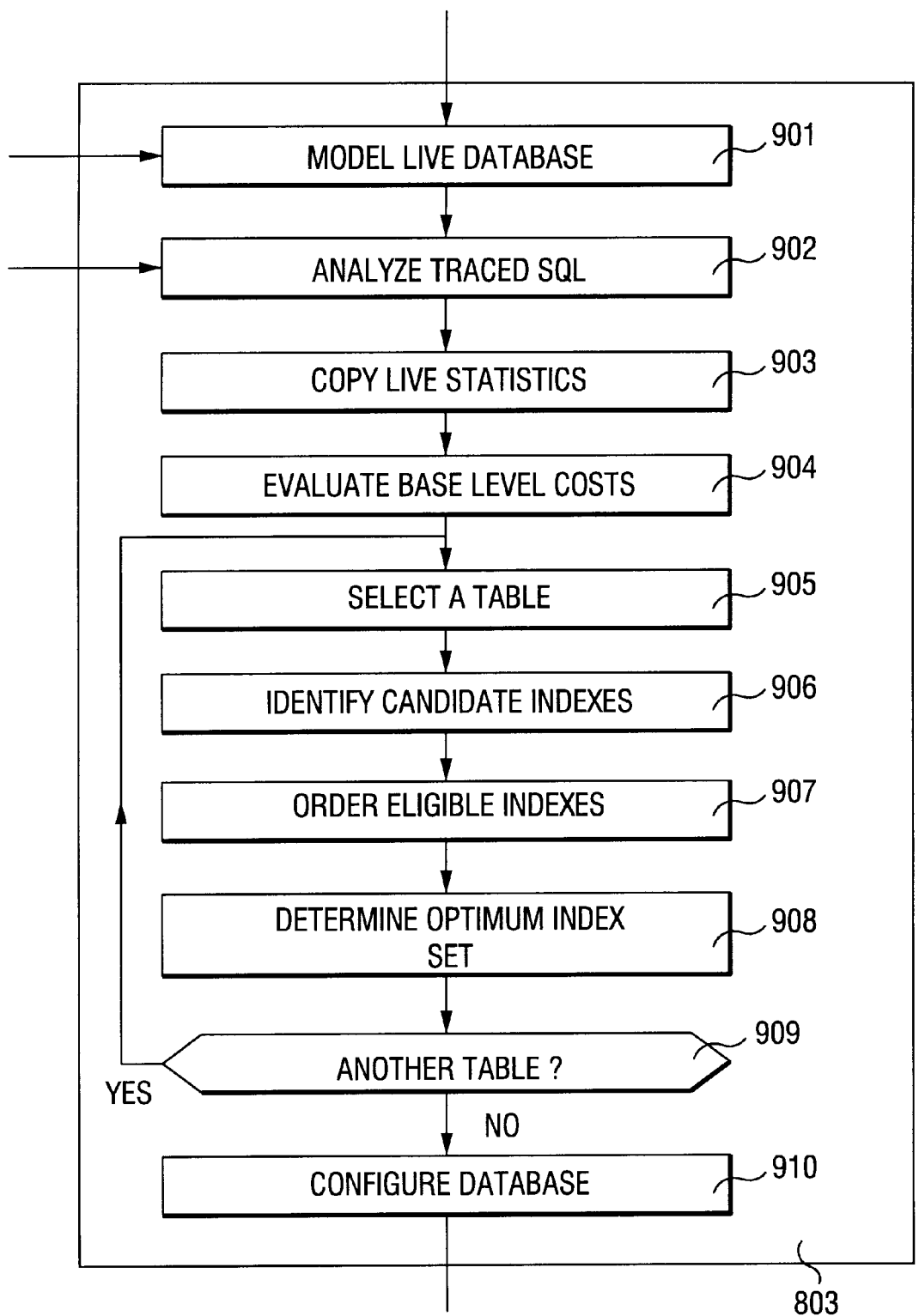
FIG. 9 illustrates the process for specifying index sets identified in FIG. 8, including a process for modelling a live database, a process for analzsing typical SQL statements, a process for base cost calculation, a process for identifying potential indexes and a process for specifying preferred indexes.

Procedures 803 for preferred index set specification are shown in FIG. 9. At step 901 the live database is modelled within the specifier process 708, in accordance with procedures detailed in FIG. 10. Thereafter, the SQL statements traced by the SQL trace process 718 are analyzed by the specifier 708, in accordance with procedures detailed in FIG. 11.

The modelling of the live database results in tables being generated, similar to the tables shown in FIG. 7, but being substantially smaller than the tables present in the on-line live system. Within the specification process, it would be possible to run the catalog statistics procedure, resulting in catalog statistics being generated which reflect the size of entries within the modelled tables. However, the specifier process 708 is concerned with the efficient operation of the live system, therefore it is more concerned with the catalog statistics contained within the live system, as stored in the live catalog 702. Thus, at step 903 the live statistics from said catalog are copied to the index set specification process, along with default sets of live indexes, consisting of the primary key index and clustering indexes for each table.

At step 904 an evaluation of base level costs are calculated, as detailed in FIG. 12, to provide a reference so that cost improvements may be deduced when potentially optimum indexes have been added. This cost differential provides an objective function for subsequent processing concerning the specification of index sets.

Most of the calculations performed to identify index sets are carried out on a table-by-table basis, whereafter the tables are only considered in combination again when an assessment is being made as to which particular indexes may be created on the live system, given the availability of disc space for index creation. Consequently, a table is selected at step 905, candidate indexes are identified at step 906, eligible indexes are ordered in accordance with their objective function at step 907 and an optimum set of indexes is produced at step 908. Thereafter, a question is asked at step 909 as to whether another table is available and if answered in the affirmative control is returned to step 905. Eventually, the question asked at step 909 will be answered in the negative, resulting in control being directed to step 910, whereupon the optimum set of indexes is specified possibly for application to the live system.

Figure 10:
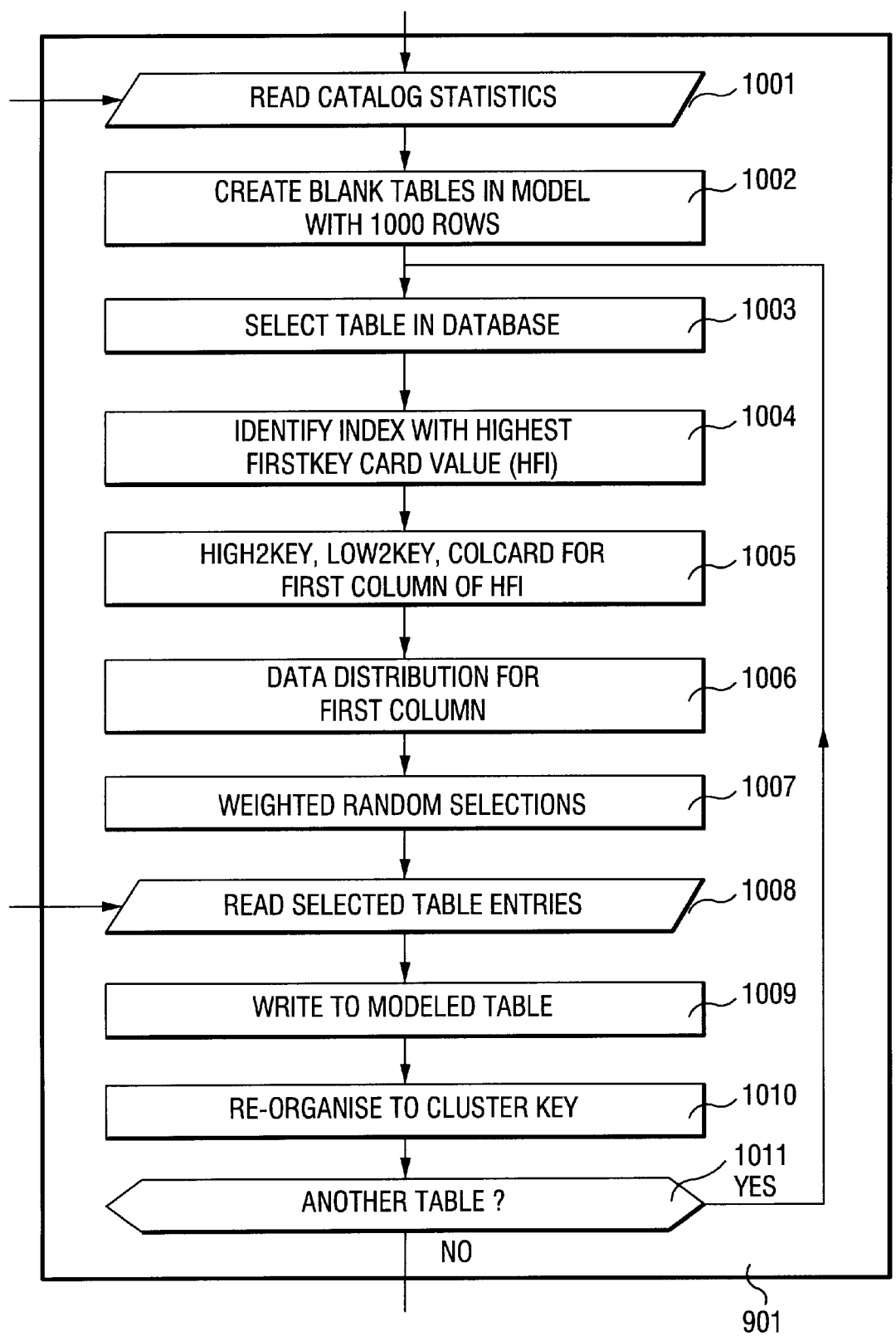
FIG. 10 details the process for modelling the live database, identified in FIG. 9.

Procedures 901 for modelling the live database, in order to generate a scaled-down model of the database within the index set specifying process, are shown in FIG. 10. At step 1001 the catalog statistics are read from the catalog 702 whereafter empty tables are created in the model, copying the nature of the live tables 704, 705 and 706, as described by their respective catalog definitions. The size of each table is restricted to five thousand rows, this being substantially smaller than the number of rows present in the live database tables.

In order to ensure that the scaled-down model of the tables within the index set specifying process 708 accurately reflect the live tables in the data store 702, it is necessary for the empty tables created at step 1002 to be populated with a representative sample of data entries read from their respective live tables. At step 1003 a live table, along with its respective catalog, is selected.

At step 1004 the indexes already associated with the selected table and operational within the live database are considered to identify the specific index having the highest firstkey card value, represented as the HFI. At step 1005 the HIGH2KEY, LOW2KEY and COLCARD for the first column of the HFI are identified and at step 1006 the data distribution for said first column is determined.

Thereafter, at step 1007 a set of random values are generated for the first column of the HFI within the range defined by LOW2KEY and HIGH2KEY. The availability of values is weighted in accordance with frequency distributions, as determined at step 1006 such that, when the model table has been populated by up to five thousand entries derived from the live table, the distribution of values in the model is sufficient to allow processes to be performed on the model, in terms of its processing requirements, which substantially reflect similar requirements made when implemented on the respective live table. At step 1008 the randomly selected values identified at step 1007 are read from the live table entries and at step 1009 the entries read at step 1008 are sequentially written to the model table at step 1009.

At step 1010 the model data is processed such that, firstly, in the data tables the entries are re-organised in accordance with the cluster key. Potential indexes are created for each table and statistics are collected relating to the nature of these indexes. The index statistics obtained are scaled up to production size allowing the scaled-up values to be saved and the originating table data to be deleted.

The question asked at step 1011 will be answered in the affirmative, until all of the modelled tables have been populated with entries randomly selected, weighted in accordance with frequency, from the live tables held within the data store 702.

Figure 11:
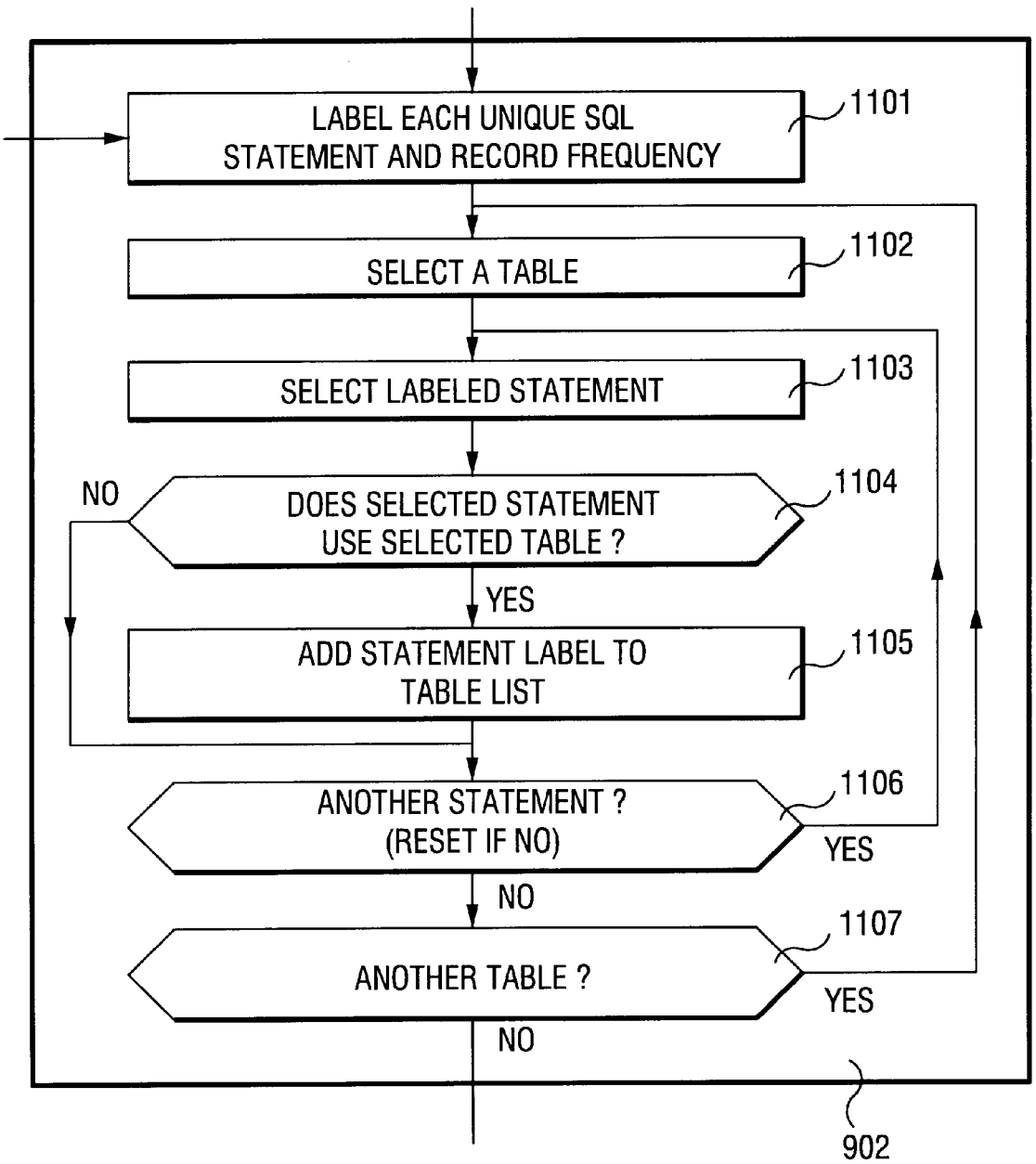
FIG. 11 details the process for analysing SQL statements identified in FIG. 9.

Procedures 902 for analysing captured SQL statements are detailed in FIG. 11. At step 1101 an SQL statement is processed to determine whether it is the first occurrence of a particular statement or whether the statement has been seen before. Thus, each unique SQL statement is given a unique label and if the same SQL statement is identified again, the number of occurrences is recorded in a frequency column.

At step 1102 a table is selected and at step 1103 an SQL statement, labelled at step 1101, is identified. Thus, procedures 1103 to 1106 are only performed for each unique occurrence of a captured statement.

At step 1104 a question is asked as to whether the statement selected at step 1103 makes use of the table selected at step 1102. If the question is answered in the affirmative, the statement label is added to the appropriate table list at step 1105. Alternatively, if the question asked at step 1104 is answered in the negative, step 1105 is bypassed, with control being directed to step 1106.

At step 1106, a question is asked as to whether another statement is to be considered and if answered in the affirmative control is returned to step 1103, allowing the next labelled statement to be selected. Alternatively, if answered in the negative, to the effect that no further statements are available, a statement identifying pointer is reset and control is directed to step 1107. At step 1107 a question is asked as to whether another table is present and if answered in the affirmative, control is returned to step 1102 for the next table to be selected.

Eventually, all of the tables will have been considered resulting in the question asked at step 1107 being answered in the negative.

The table list generated at step 1105 is detailed in FIG. 12. The list consists of a first column 1201 identifying an originating table, a second column 1202 identifying SQL statements, in terms of their labels as specified at step 1101 and a third column 1203 identifying statement frequency, that is, the number of times a particular SQL statement occurs within the traced set.

As shown in FIG. 12, table 1 has been selected first at step 1102, resulting in SQL statements A, B, C etc to SQL Z being added to the table list in response to repeated operations at step 1005. Thereafter, table 2 has been selected, resulting in SQL labels being identified with this table and, finally, table 3 has been selected resulted in statement labels being associated with that table. In the present example, three tables are present but it should be appreciated that any number of tables may be present as used within large relational databases.

In the third column 1203 the frequency of occurrences have been recorded which, typically, would be measured in thousands. Thus, x occurrences have been recorded against statement A, y occurrences have been recorded against statement B and z occurrences have been recorded against statement C, etc.

Figure 13:
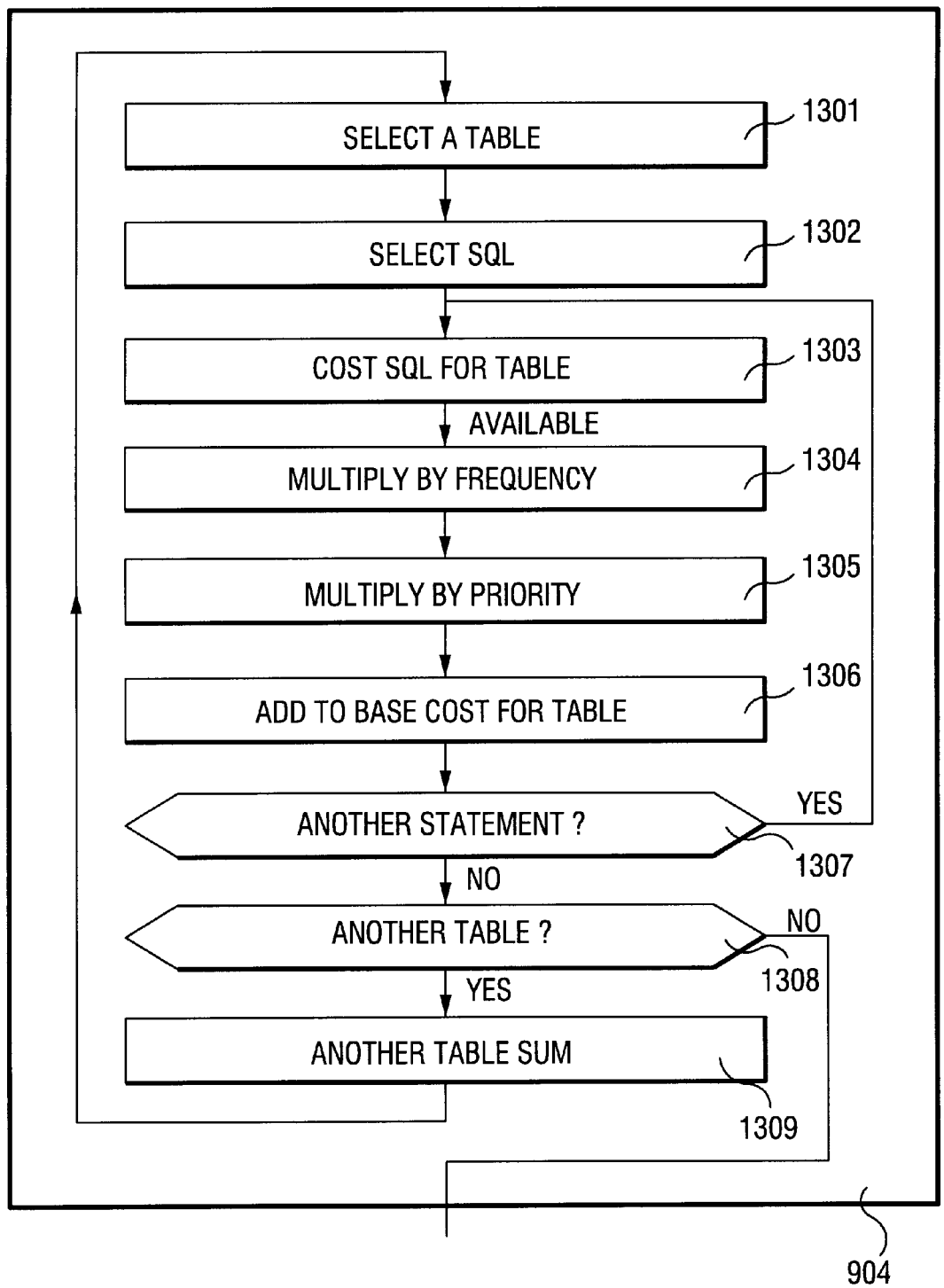
FIG. 13 details the process for calculating a base cost, identified in FIG. 9.

Procedures 904 for evaluating base level costs are detailed in FIG. 13. At step 1301 a table is selected and at step 1302 an SQL statement is selected. At step 1303 the cost of executing the SQL statement selected at step 1302 is estimated, when applied to the table selected at step 1301. Costing may be effected using timeron values derived from the optimizer present within the SQL execution process 703. However, timeron values only take account of using an index and do not take account of index maintenance. Consequently, in a preferred embodiment, instructions developed by Innovation Management Solutions of Florida, USA under the Trade Mark "QCF" are implemented to provide a cost value for the index, in terms of CPU use and elapsed time for the SQL statement to be executed, in combination with an estimation of index maintenance. These cost values do not represent any absolute cost measurement but by performing similar procedures when additional indexes are present, it is possible to obtain relative cost values which, when compared with the requirement for additional disk space, provide an objective function by which a particular index may be selected in preference to a more expensive index.

At step 1304 the cost value calculated at step 1303 for each statement is multiplied by a frequency of execution factor and at step 1305 the resulting product is multiplied by a priority factor. Thereafter, at step 1306 the cost is added to a base cost sum for the particular table and at step 1307 a question is asked as to whether another statement is present. When answered in the affirmative, control is returned to step 1302, resulting in the next SQL statement being selected and the costing procedures being repeated.

Eventually, the question asked at step 1307 will be answered in the negative, resulting in a question being asked at step 1308 as to whether another table is present. If answered in the affirmative, another table sum is created at step 1309 and control is returned to step 1301, allowing the next table to be selected. Eventually, the question asked at step 1308 will be answered in the negative, thereby directing control to step 905.

Figure 14:
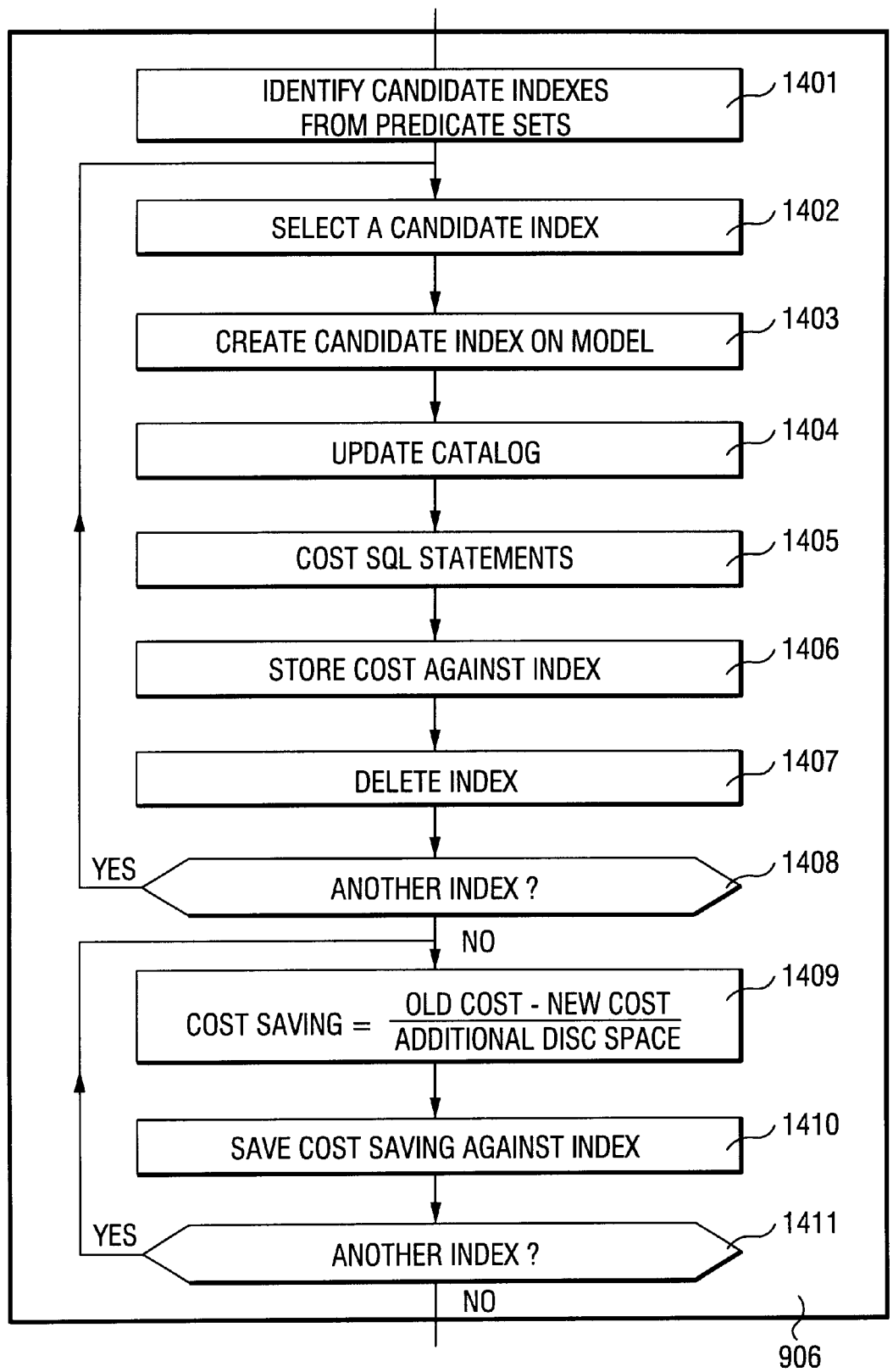
FIG. 14 details the process for identifying and ordering potential indexes illustrated in FIG. 9.

Procedures for costing candidate indexes to identify eligible indexes are detailed at FIG. 14. At step 1401 candidate indexes are identified from predicate sets derived from SQL statements associated with the table under consideration, defined by the selection made at step 905, in accordance with the list shown in FIG. 12. Thus, analysis of the SQL statements associated with the table under consideration allows indexable predicates to be identified. The identified indexable predicates reference particular columns and these columns are grouped by table and SQL statement to form predicate sets. These predicate sets provide a starting point for identifying the candidate indexes (ie from which candidate indexes are built) that could be of possible benefit when satisfying the associated SQL statements. In addition, catalog statistics are generated for each of the identified indexes.

At step 1402 a candidate index is selected and at step 1403 the index selected at step 1302 is created as part of the table model held within the index set specification process 708. After the new index has been created at step 1403, the associated catalog entries within the model are updated at step 1404, so that the index appears full size.

Candidate indexes are created against the model database. The DB2 recover index utility is run against the table to populate the indexes, and the DB2 Runstats utility is run against the database to collect the statistics. The statistics are collected for each Index, they are stored in a database and are scaled up to live volumes for use throughout the process.

The possible indexes identified at step 1401 will include all possible combinations of indexes using particular column entries. Thus, the columns may be placed in different orders and all possible orders are included. Similarly, the entries within each column may be ascending and descending and again all possible combinations of these will be present. Not all of these combinations are actually required as candidate indexes, therefore a selection process occurs at step 1402 in order to identify candidate indexes. The column position is referred to as column sequencing and the possibilities of being ascending or descending are referred to as ordering. Indexes sharing the same column sequencing are grouped together, exhibiting only differences in terms of their ordering. Now, within the model, ail of the indexes defined within the group, that is all of the indexes having the same column sequence, are generated. The catalog statistics for each of these indexes is also generated and then all of the trapped SQL that references the table is targeted upon the indexes. The explain function within the database is then exercised in order to identify the particular indexes within the group that are actually employed. These indexes then become the selected candidate indexes and the remaining indexes from the possible set are rejected. Thereafter, the created indexes are deleted and the next group is considered until all of the groups have been considered resulting in the finally created indexes again being deleted before control is directed to the loop initiated at step 1402.

Thus, as previously stated, a candidate index is selected at step 1402, a candidate index is created at step 1403 and the catalog is updated, in response to the newly created index, at step 1404.

Now that the new index has been created within the model, the SQL statements which reference the respective tables are costed in accordance with procedures substantially similar to those detailed in FIG. 13, where the base cost levels were calculated. After the SQL statements have been costed, with the new index in place, at step 1405, a new cost value is stored at step 1406, whereafter the index created at step 1303 is deleted at step 1407.

At step 1408 a question is asked as to whether another index is present and when answered in the affirmative control is returned to step 1402, resulting in the next possible index being selected. Eventually, all of the SQL statements will have been costed for all of the possible indexes, resulting in the question asked at step 1408 being answered in the negative.

The cost values calculated at step 1406, and stored in a table, define a new cost for each of the possible indexes identified at step 1401. For each of these indexes a cost saving is calculated by subtracting the new cost from the base cost calculated at step 904. This cost saving value represents the objective function in that indexes having a lower cost saving will be considered as being more optimum than indexes having a higher cost saving. The cost saving values are stored for each index at step 1410 and at step 1411 a question is asked as to whether another index is present. When answered in the affirmative, the cost saving for the next index is calculated at step 1409, until cost savings have been calculated for all of the possible indexes, resulting in the question asked at step 1411 being answered in the negative.

As a result of storing cost saving values at step 1410, a list of indexes will have been created with a cost saving value assigned to each. This represents the objective function, therefore at step 907 the eligible indexes are ordered in accordance with this objective function, such that indexes having a high cost saving are placed towards the top of the eligibility list.

Figure 15:
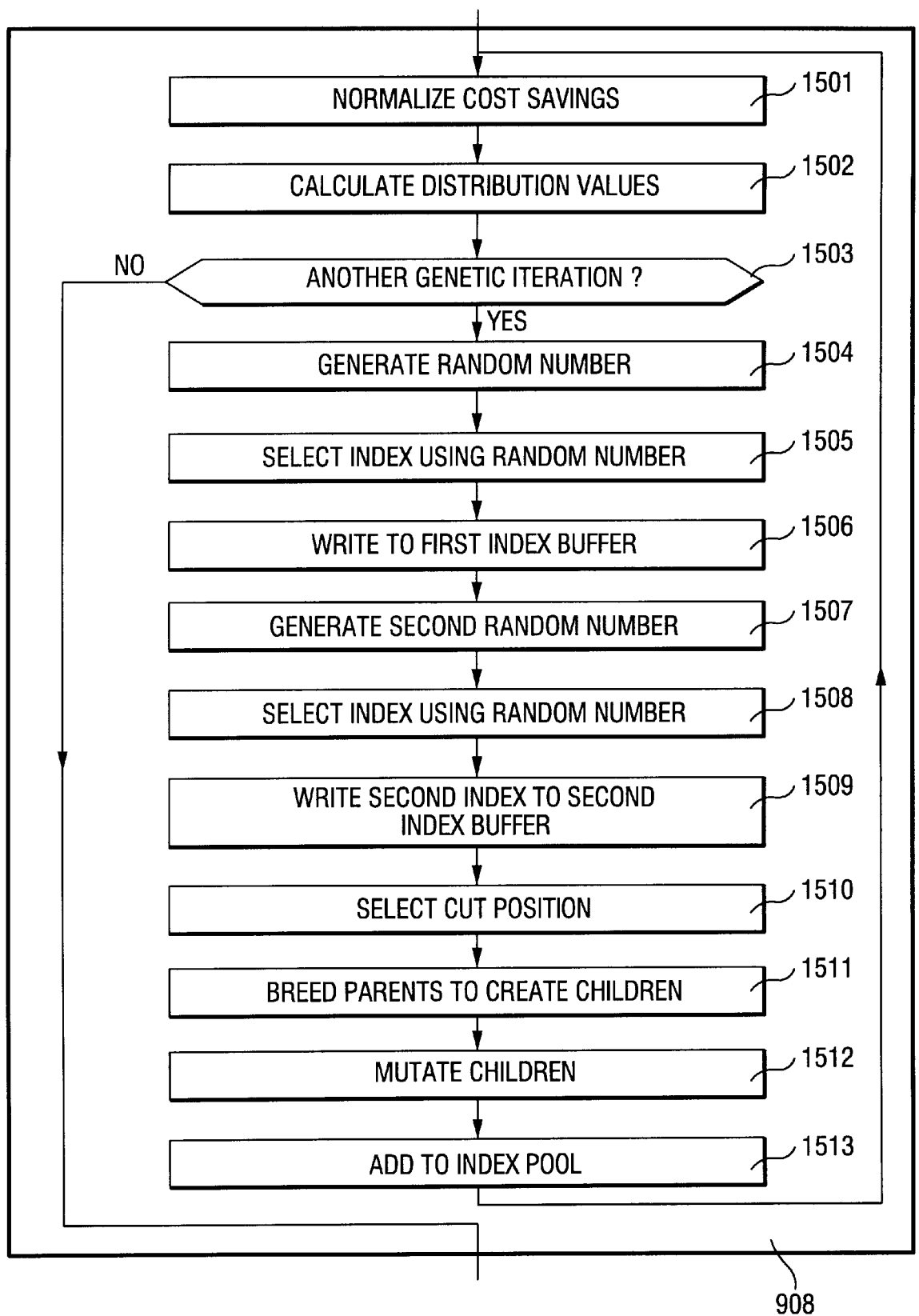
FIG. 15 details the process for specifying a preferred set of indexes, identified in FIG. 9.
Figure 17:
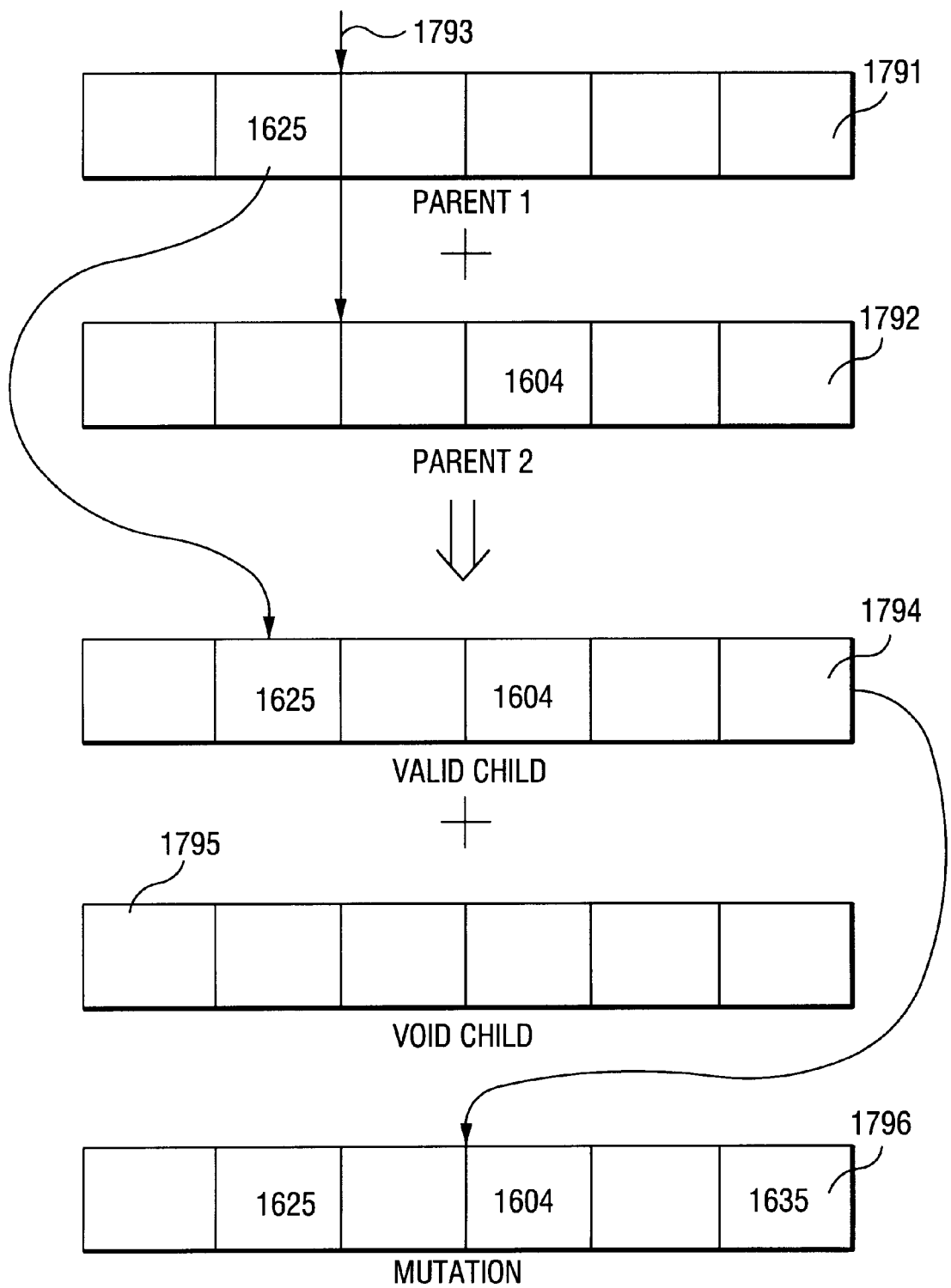
FIG. 17 illustrates the generation of new combination indexes using the process detailed in FIG. 15.

Process 908, shown in FIG. 9, for processing the ordered potential indexes, is detailed in FIG. 15 and an example of the operations performed in accordance with the procedures of FIG. 15 is shown in FIGS. 16 and 17.

FIG. 16 shows eleven potential indexes that are represented by unique identification numerals 1625, 1616, 1604, 1673, 1612, 1646, 1635, 1691, 1622, 1683 and 1617. The procedures previously identified defined cost savings for these indexes, representing a degree of preference for inclusion in the specified set of optimum indexes. Thus, the eligible indexes represented in FIG. 16 have been ordered in terms of their preference for being specified with relative cost savings being recorded against each index. These cost saving values have no absolute meaning but provide relative indications of cost savings calculated in accordance with the previously described procedures. Thus, index 1625 has been identified as providing a cost saving of 73, with index 1616 providing a cost saving of 72, index 1604 providing a cost saving of 68 and so on until index 1617 which has been identified as providing a cost saving of 4. Thus, the information required for ordering the indexes 1625 to 1617 in terms of their cost saving eligibility has been calculated in accordance with the procedures detailed at step 803.

At step 1501 of FIG. 15 the cost savings are considered and normalized to facilitate subsequent processing. Normalization allows the cost saving values to be considered within a predetermined range which, in the present example, has been selected as 0 to 9999. A total cost saving is calculated, as shown at 1681 in FIG. 16, which, in this example, has been calculated to a value of 500. The total range is divided by this cost saving total 1681 to provide unit range values which are then multiplied by the cost saving values to provide distribution values. The calculation of distribution values is performed at step 1502 resulting in normalized cost savings being calculated. Thus, in accordance with the procedures implemented at step 1502, the cost saving for index 1625 is normalized to a value of 1660, with index 1616 being normalized (from a cost saving value of 72) to a normalized value of 1440. Similarly, normalized values are calculated for all of the indexes under consideration such that, when totalled, the normalized values equal the full range of values within the distribution, that is 9999 in this example.

At step 1503 a question is asked as to whether another genetic iteration is required which, on the first iteration, will be answered in the affirmative. A pre-selection is made as to the number of genetic iterations required and a counting operation will be established at step 1503.

When answered in the affirmative a random number is generated at step 1504 lying within the range 0 to 9999. This random number is used at step 1505 to select a particular index. Thus, a random index selection is made at step 1505 weighted in terms of the cost saving provided by the particular index. Thus, numbers lying between 0 and 80 will result in index 1617 being selected, with numbers lying within the range 81 to 400 resulting in index 1683 being selected, numbers within the range 401 to 820 resulting in index 1622 being selected and so on until numbers lying within the range 8540 to 9999 will result in index 1625 being selected. Thus, the number of distribution numbers allocated for a particular index is proportional to its relative cost saving, such that, over a large number of iterations, indexes having a higher cost saving will be selected, on average in preference to indexes having a lower cost saving. However, the indexes of lower cost saving still remain in the pool and it is possible, in accordance with the genetic procedures, for these indexes to be selected.

On each iteration, new combinations of indexes will be produced and these index combinations will in turn provide a particular cost saving. This allows the index combination to be given its own index identification and for the compound index to be included within the table shown in FIG. 16, ordered in terms of the objective function.

Thus, at step 1505 a particular index is selected and at step 1506 the selected index is written to an index buffer. An index buffer 1791 is shown in FIG. 17 consisting of six buffer locations representing the maximum number of allowed indexes for the particular table under consideration. Referring to FIG. 7, it was shown that each table may have a maximum of six indexes within the particular embodiment, although this figure may be adjusted in order to satisfy particular local operating conditions. Thus, buffer 1791 has six locations and a selected index identification, such as index 1625 may be placed in any of these locations, selected on a random basis. Thus, as shown in FIG. 17, an identification of index 1625 has been placed in the second buffer location of index buffer 1791.

At step 1507 a second random number is generated, within the range 0 to 9999, resulting in a second parent index being selected at step 1508. An indication of the selected index is written to a second index buffer, shown as 1792 in FIG. 17. In this example, the random number generated at step 1507 resulted in index 1604 being selected and positioned, randomly, at the fourth location within buffer 1792.

At step 1510 a buffer-out position is selected randomly at any interface between locations within the particular buffers. In this example, the out has been positioned between the second location and the third location, as indicated by arrows 1793 in FIG. 17. This out position allows a mating of buffer 1791, a first parent, with buffer 1792, that may be considered as the second parent. The result of this exchange is shown in buffers 1794 and 1795. In buffer 1794 index 1625 has been placed in a second position, derived from the first parent 1791 and index identification 1604 has been placed in the fourth location, derived from parent 1792. As shown by buffer 1795, the other off-spring of this mating does not contain any index identifications and therefore may be considered as a void child and is not considered any further. Thus, at step 1511 in FIG. 15 a "breeding" of the two parents takes place resulting in a generation of child 1794, containing indexes 1625 and 1604.

In order to add further interest to the availability of potentially optimum indexes, a further stage of genetic manipulation occurs in that the child defined by the contents of buffer 1794 is mutated. A further random number is generated, resulting in the selection of a further index. As a result of this mutation process at step 1512, buffer 1796 has been loaded with index indications derived from child 1794 plus the random addition of index 1635 at the sixth location. At step 1513 cost savings for the children created at step 1511 and cost savings for the mutants created at step 1512 are evaluated.

New indexes 1794 and 1796 are now added to the pool of potential indexes at step 1514, in order of eligibility. A cost saving is calculated for each index, with reference to the table under consideration, allowing the indexes to be added to the list shown in FIG. 16 ranked in accordance with the resulting cost saving. The total cost saving is now recalculated, whereafter new normalized cost savings are recalculated for all of the indexes, including the newly added indexes. From this normalized cost saving distribution, values are calculated for each of the indexes at step 1502 and a question is again asked as to whether another genetic iteration is required.

When the question asked at step 1503 is again answered in the affirmative, a random number within the range 0 to 9999 is generated and a new index is selected at step 1505 whereafter an indication of this index is written to the first index parent buffer 1791 at step 1506. Again, a second random number is generated at step 1507 allowing a second parent to be selected at step 1508 with an indication of this parent written to buffer 1792 at step 1509.

A out position is again randomly selected at step 1510, the parents are bred at step 1511, with their offspring being written to buffers 1794 and 1795, whereafter mutations are generated from valid children. Thus, each iteration may add up to four new indexes to the index mating pool.

Eventually, the question asked at step 1503 will be answered in the negative resulting in control being directed to step 805 of FIG. 8. While the process shown in FIG. 15 is repeated, new index calculations will be identified in a substantially random way. However, each new index will be tested to determine its resulting cost saving and indexes having high cost savings are placed towards the top of the list shown in FIG. 16. Furthermore, by having a relatively high cost saving, the distribution range of selecting numbers will also be larger, thereby giving these indexes a greater probability of being selected for mating. However, relatively low probability indexes remain in the pool and it is therefore possible that such indexes could be selected. With sufficient iterations, index combinations providing very high cost savings will be identified and these indexes will be placed towards the top of the list shown in FIG. 16. Consequently, when the process shown in FIG. 15 terminates, the indexes, including newly-bred indexes, will be listed for production in the specification, in descending order of cost saving.

Figure 18:
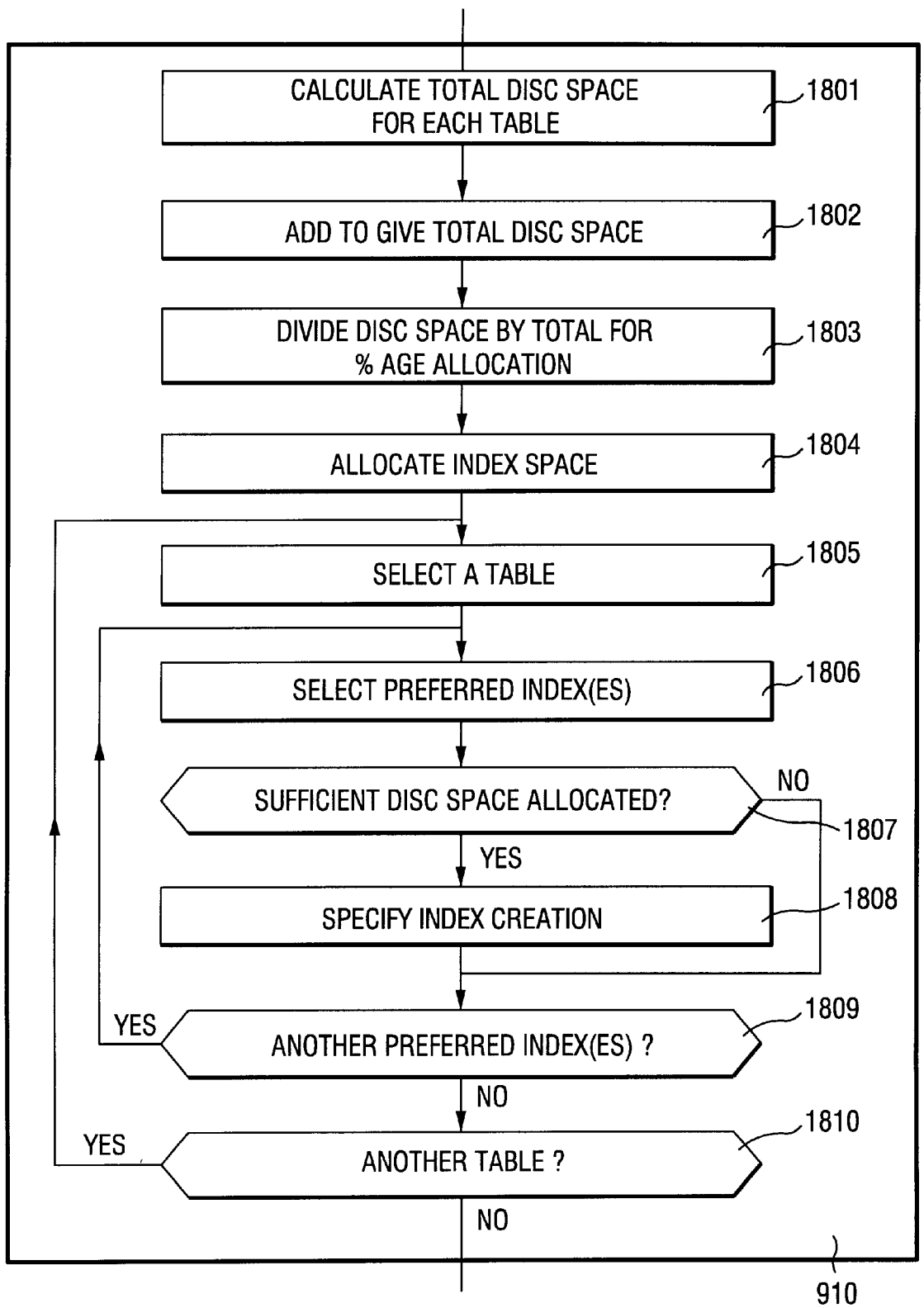
FIG. 18 illustrates a procedure for establishing indexes within a live database.

Procedures identified at step 910 in FIG. 9 for configuring the database to include specified indexes are detailed in FIG. 18. The objective function, specifying relative cost savings, has been considered for indexes only in relation to their associated table. However, in the working database system, a plurality of tables must work together. Therefore, for a given availability of storage space, storage space must be allocated for indexes associated with all of the tables present.

At step 1801 the total amount of disc space used by each table present within the live database is calculated and at step 1802 the values calculated at step 1801 are added together to give the total disk space requirement for all of the tables. At step 1803 the disk space required by each table is divided by the total disk space to provide a percentage allocation of disk space on a table-by-table basis. This percentage allocation is used to allocate index space as shown at step 1804, such that the relative amount of storage allocated for the creation of indexes is substantially equal to the relative allocation of storage space for the tables. Thus, when a table takes up a large amount of disk space, a similarly large allocation of disk space is made for indexes operating over this table.

At step 1805 a table is selected and at step 1806 the most eligible index obtained for that table is selected. At step 1807 a question is asked as to whether sufficient disk space has been allocated for the preferred indexes selected at step 1806 to be created on the live system. If this question is answered in the affirmative, the indexes selected at step 1806 are specified for creation, at step 1808. Alternatively, if insufficient disk space is available, resulting in the question asked at step 1807 being answered in the negative, step 1808 is by-passed and control is directed to step 1809.

At step 1809 a question is asked as to whether another table is present and when answered in the affirmative control is returned to step 1805, resulting in the next table being selected and eligible indexes for this table being considered at steps 1806 and 1807. Eventually all of the indexes for the selected table will have been considered, resulting in the question asked at step 1809 being answered in the negative.

The procedures detailed in FIG. 18 would be implemented subject to the question asked at step 808 being answered in the affirmative. Thus, the new index structure may be created within the live database, whereafter the database, with its new indexes in place, would be placed on-line at step 810.

Referring to FIG. 14, the process performed at step 1401 may become very time consuming if the predicate sets result in indexes being identified which may require more than four columns. Under these circumstances, the first four preferred columns are selected and remaining columns are provisionally rejected. A selection is made on the basis of filter factor and the four columns having the lowest filter factor are selected. These four columns, with all possible ordering possibilities, are processed to select the candidate indexes as previously described.

After all of the eligible indexes have been determined, the large indexes, provisionally rejected, are assembled by adding the fifth preferred column, sixth preferred column and seventh preferred column etc to create a new five column index, a new six column index, a new seven column index etc. These indexes are built upon the most cost-effective candidate index containing the necessary four columns. These columns are only added to the four column candidate indexes in ascending order, the catalog statistics are calculated for these new indexes and thereafter these new indexes are costed so that they may in turn be added to the ordered eligibility list, placed in order of eligibility with the previously costed indexes.

Referring to FIG. 15, the number of eligible indexes considered for the genetic process, initiated at step 1505, may be considerable, resulting in the processing time being relatively large. Under these circumstances, it may be preferable to place an upper bound upon the size of the "mating pool" before the genetic process is implemented. Typically, the size of the mating pool may be restricted to a maximum of thirty eligible indexes prior to performing the genetic operations.

The purpose of the genetic process is essentially to allow composite indexes to be found which, when implementing the typical SQL query set, may significantly reduce processing overhead. In order to reduce processing time, it may be preferable to perform some "pool priming", by adding index sets that are considered to be particularly advantageous.

A first stage of pool priming may consist of investigating the existing live database system to determine which indexes are actually being used in the live system. These index sets may then be added to the collection of eligible indexes as previously described.

A second process for pool priming may consist of reconsidering the eligibility ranking after the most eligible index has been assumed to be present within the live system. Thus, the cost factors are reconsidered from a starting position in which the most eligible index, as previously calculated, is placed as belonging to the live system. With this live index added to the system, some of the cost savings of the remaining eligible indexes may vary considerably, thereby effectively reordering the indexes within the eligibility list. Again the most cost effective remaining eligible index is added to the system and cost savings are recalculated, based on this new index being present. This process may be repeated, iteratively, providing, say, up to a set of six new indexes. Each of these sets of indexes are added to the mating pool at the appropriate time.

What is claimed is:

1. A method of specifying a set of indexes for a database, comprising the steps of:
   analysing a plurality of statements supplied to said database to identify indexable predicates;
   deriving indexes from the indexable predicates identified in said analysing step;
   evaluating levels of improved operation achievable with said indexes by evaluating costs savings;
   processing said evaluated levels to specify a preferred set of indexes for said database.

2. A method according to claim 1, wherein levels of improved operation are evaluated by creating a scaled-down model of database tables derived from information relating to the nature of said tables.

3. A method according to claim 2, wherein said model database is populated with representative data entries taken from the live database being modelled.

4. A method according to claim 3, wherein said model is populated by considering the cardinality of an existing index of the live database.

5. A method according to claim 3, wherein said model database is populated by considering the distribution of entries within an existing index of the live database.

6. A method according to claim 2, wherein database statistics are copied from the live database to the database model.

7. A method according to claim 1 wherein possible indexes are ordered in terms of potentiality for being specified as preferred indexes.

8. A method according to claim 7, wherein index combinations are identified by randomly combining existing possible indexes and measuring cost savings for said potential index combinations to produce a revised list of preferred indexes.

9. A method according to claim 8, wherein said random selection is weighted in terms of previously calculated cost savings.

10. A method according to claim 9, wherein weighting values are recalculated when new indexes are added to the preferred list.

11. A method according to claim 1 wherein, in said steps of evaluating levels of improved operation, a base cost is calculated for executing statements without additional indexes being present, new costs are calculated for executing statements for new possible indexes, and the old cost is compared with the new costs to obtain cost savings.

12. A method according to claim 11, wherein each cost saving is calculated by subtracting the new cost from the old cost.

13. A method according to claim 12, wherein cost savings are calculated for database tables by considering each new possible index in turn with reference to its respective table.

14. A method according to claim 11 wherein cost calculation includes estimating execution time.

15. A method according to claim 11 wherein cost calculation including assessing index maintenance overheads.

16. A database comprising a plurality of data tables stored in machine readable form, processing means for processing said data tables in response to statements and for generating indexes to facilitate the processing of said data tables, further comprising instructions executable by said processing means for specifying a preferred index set, wherein said instructions are configured to analyse a plurality of statements supplied to said database to identify indexable predicates, derive indexes from said indexable predicates, evaluate levels of improved operation achievable with said indexes by evaluating cost savings and process said evaluated levels to specify a preferred index set for said database.

17. An apparatus for specifying an index set for a database comprising:
- analysing means for analysing a plurality of statements supplied to the database to identify indexable predicates;
- deriving means operable to derive indexes from the indexable predicates identified by said analysing means;
- evaluating means for evaluating levels of improved operation achievable with said indexes by evaluating cost savings; and
- specifying means operable to process said evaluated levels and specify a preferred set of indexes for said database.

18. Apparatus according to claim 17 in which levels of improved operation are evaluated by creating a scaled down model of database tables derived from information relating to the nature of said tables.

19. Apparatus according to claim 18 in which said model database is populated with representative data and is taken from the live database being modelled.

20. Apparatus according to claim 19 in which said model is populated by considering the cardinality of an existing index of the live database.

21. Apparatus according to claim 19 in which said model database is populated by considering the distribution of entries within an existing index of the live database.

22. Apparatus according to claim 18 in which database statistics are copied from the live database to the database model.

23. Apparatus according to claim 17 in which possible indexes are ordered in terms of potentiality for being specified as preferred indexes.

24. Apparatus according to claim 23 in which index combinations are identified by randomly combining existing possible indexes and measuring cost savings for said potential index combinations to produce a revised list of preferred indexes.

25. Apparatus according to claim 24 in which said random selection is waited in terms of previously calculated cost savings.

26. Apparatus according to claim 25 in which waiting values are recalculated when new indexes are added to the preferred list.

27. Apparatus according to claim 17 in which a base cost is calculated for executing statements without additional indexes being present, new costs are calculated for new possible indexes and the old cost is compared with the new costs to obtain cost savings.

28. Data processing apparatus arranged to specify an index set for a database, said apparatus comprising data storage means, data processing means and program instructions readable from said data storage means, wherein said processing means is configured, in response to said instructions, to provide means for:
- analysing a plurality of statements supplied to said database to identify indexable predicates;
- deriving indexes from the indexable predicates identified;
- evaluating levels of improved operation achievable with said indexes by evaluating cost savings; and
- processing said evaluated levels to specify a set of preferred indexes for said database.

29. A data processing apparatus for specifying an index set for a database, said apparatus comprising at least one disc storage device for storing data, a computer for processing data, and program instructions readable from said at least one disc storage device, wherein said computer is comprised of at least one processor, said at least one processor, in response to said instructions:
- analysing a plurality of statements supplied to said database to identify indexable predicates;
- deriving indexes from the indexable predicates identified;
- evaluating levels of improved operation achievable with said indexes by evaluating cost savings; and
- processing said evaluated levels to specify a set of preferred indexes for said database.

* * * * *